United States Patent
Nishikawa

(10) Patent No.: US 8,421,823 B2
(45) Date of Patent: Apr. 16, 2013

(54) OVERLAYING CAMERA-DERIVED VIEWER EMOTION INDICATION ON VIDEO DISPLAY

(75) Inventor: Yuko Nishikawa, La Jolla, CA (US)

(73) Assignee: Sony Corporation, Tokyo (JP)

(*) Notice: Subject to any disclaimer, the term of this patent is extended or adjusted under 35 U.S.C. 154(b) by 182 days.

(21) Appl. No.: 13/043,799

(22) Filed: Mar. 9, 2011

(65) Prior Publication Data

US 2012/0229506 A1 Sep. 13, 2012

(51) Int. Cl.
*G09G 5/00* (2006.01)

(52) U.S. Cl.
USPC .......................................... 345/629; 345/637

(58) Field of Classification Search .................. 345/473, 345/629; 725/12

See application file for complete search history.

(56) References Cited

U.S. PATENT DOCUMENTS

2012/0069028 A1* 3/2012 Bouguerra .................... 345/473
2012/0233633 A1* 9/2012 Nishikawa ...................... 725/12

* cited by examiner

*Primary Examiner* — Chante Harrison
(74) *Attorney, Agent, or Firm* — John L. Rogitz

(57) ABSTRACT

A method whereby an actual image of a TV viewer as captured by a camera housed in the TV, or an emoticon selected by the processor of the TV through the use of facial recognition method, can be displayed on the viewer's display or a friend's display along with title of video, audio captured by a microphone also housed in the viewer's TV, and text inputted by the viewer.

20 Claims, 3 Drawing Sheets

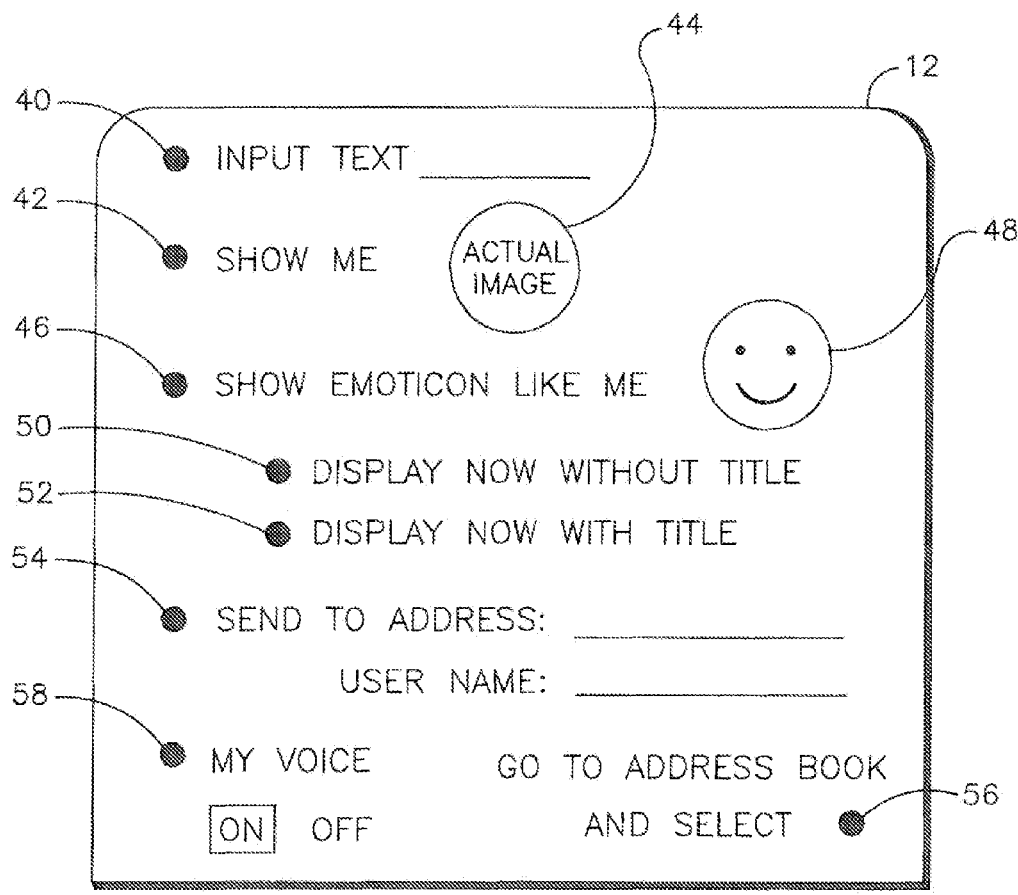
FIG. 2
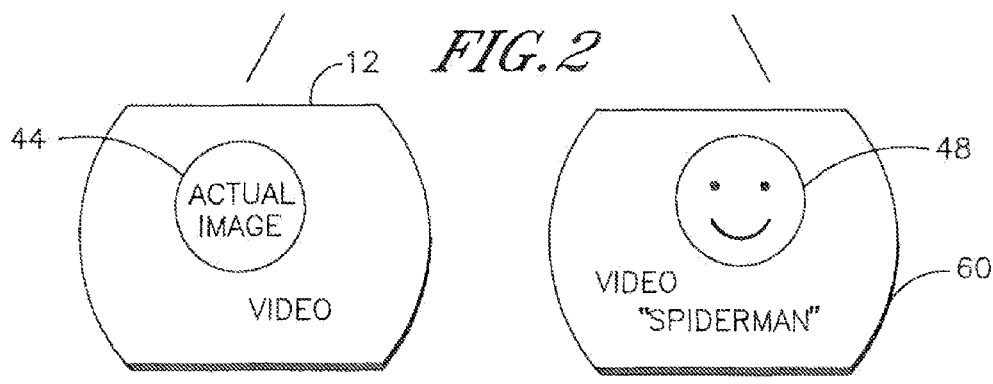
FIG. 3 (VIEWER'S VIDEO DISPLAY)
FIG. 4 (FRIEND VIDEO DISPLAY)

OVERLAYING CAMERA-DERIVED VIEWER EMOTION INDICATION ON VIDEO DISPLAY

FIELD OF THE INVENTION

The present application relates generally to overlaying camera-derived viewer emotion indications such as an actual viewer image or an emoticon derived from the viewer image onto video being presented on a video display.

BACKGROUND OF THE INVENTION

Television displays have been a source of entertainment for friends and families for decades, but the viewers must be together in the same room to share laughter, words, or facial emotions without the use of supplemental equipment such as phones or cameras. Some computers have implemented cameras into the housing or chassis that the user's image can be captured on and streamed over the Internet and viewed by a friend or family member, but this is not a common feature on TVs. As understood herein, it would be desirable to enable friends or family members who are not viewing the same TV to share facial expressions with one another via a network such as the Internet.

SUMMARY OF THE INVENTION

As understood herein, facial recognition software is able to detect emotion of a person based on an image taken of them. Present principles recognize that the emotion information can be converted into animated images, or "emoticons," or descriptive words that correspond to the detected emotion to, e.g., allow a TV viewer's image to be converted into an emoticon and sent to a friend's TV display.

Accordingly, a system includes a viewer video display and a processor coupled to the viewer video display. A camera communicates with the processor to provide the processor with captured images. The processor can execute logic on a computer readable storage medium to facilitate a viewer of the viewer video display selecting to have an image of the viewer derived from the camera to be overlaid onto video being presented on a presentation video display.

The camera can capture actual images of the viewer in real time. The processor can execute a facial recognition method to correlate one of plural emoticons to an actual facial image from the camera, and the image of the viewer derived from the camera may be one of plural emoticons. The presentation video display can be established by the viewer video display and can be a display other than the viewer video display. The viewer of the viewer video display may be permitted to input an address associated with the presentation video display.

Audio generated by the viewer and captured by a microphone communicating with the processor can be selected to be presented along with the image of the viewer derived from the camera. In addition, a title of the video, which the processor accessing a program guide can ascertain and present an alpha-numeric representation thereof, can be selected to be presented along with the image of the viewer derived from the camera.

In another aspect, a method includes capturing an image of a viewer of a first audio video display using a camera associated with the first audio video display. The method includes, based on the image, selecting an emoticon using a processor associated with the first audio video display, and displaying the emoticon on the first audio video display and/or on a second audio video display.

In another aspect, an audio video apparatus has a video display, a processor controlling the display to present video, and a computer readable storage medium accessible to the processor and bearing instructions executable by the processor to receive a viewer selection of actual image or emoticon. Responsive to a viewer selection of actual image, the processor generates an actual image of a viewer of the display and overlay the image on the video. On the other hand, responsive to a viewer selection of emoticon, the processor correlates the image to an emoticon and overlays the emoticon on the video.

Example implementation details of present principles are set forth in the description below, in which like numerals refer to like parts, and in which:

BRIEF DESCRIPTION OF THE DRAWINGS

FIG. 2 is screen shot of an example emotion presentation user interface (UI);

FIG. 3 is a screen shot of the display of the viewer's display device, assuming the user has elected to present his or her actual image as captured by the camera;

FIG. 4 is a screen shot of a friend's display device, assuming the viewer has selected to present the emoticon thereon, showing that the viewer has opted to present an emoticon derived from the viewer's image as captured by the camera.

DETAILED DESCRIPTION OF THE PREFERRED EMBODIMENT

Figure 1:
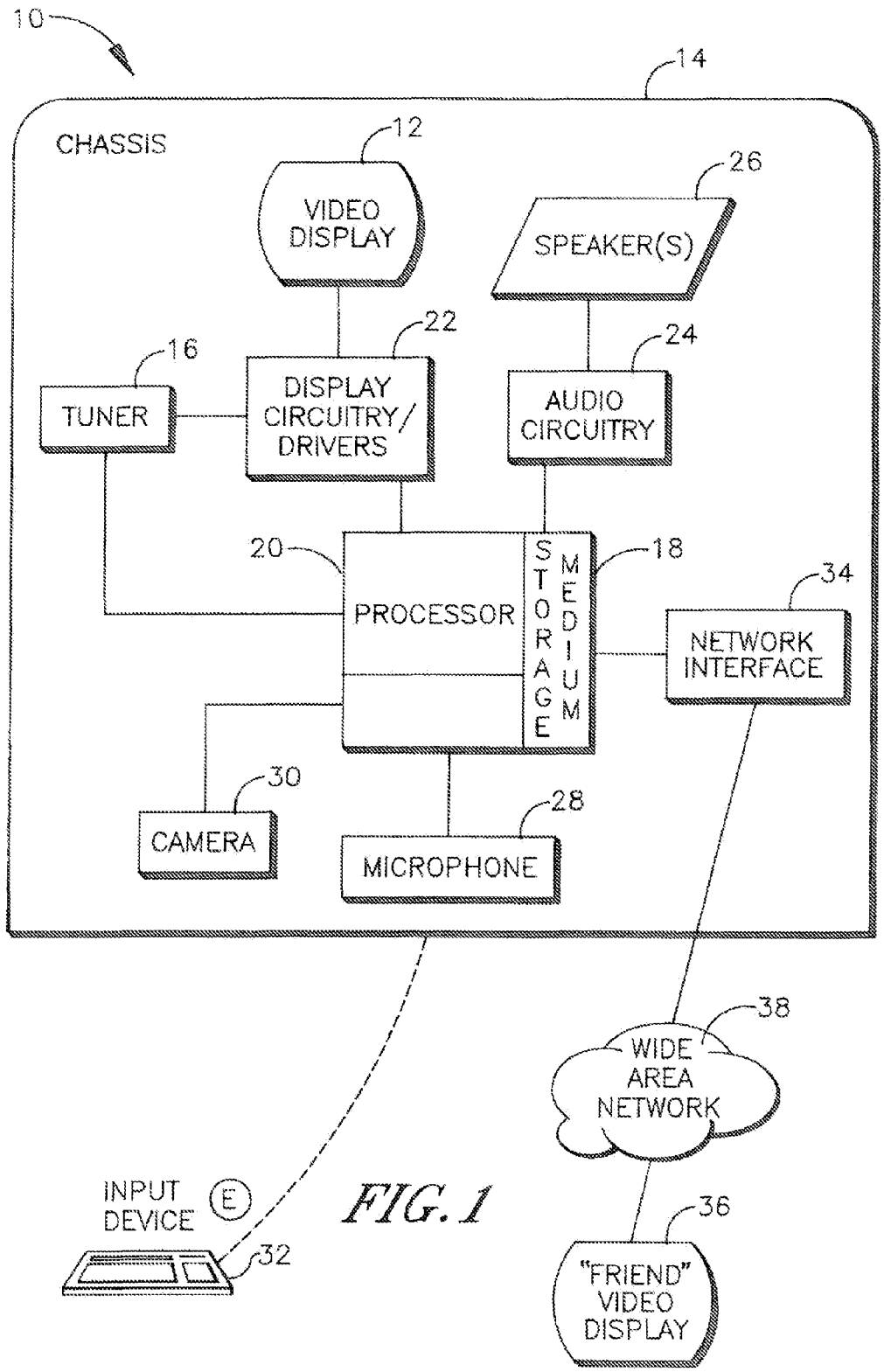
FIG. 1 is a block diagram of an example video display system implemented as a TV.

Referring initially to FIG. 1, a display device 10 includes a video display 12 and chassis 14. The display device may be, but is not limited to, a laptop computer or other computer, or a TV, etc. The display 12 may be an LCD display or other mode of display screen including a high definition (HD) TV display.

Components inside the chassis 14 can include a TV tuner 16 (when the display device is implemented by a TV), a computer readable storage medium 18 such as disk-based or solid state storage, and a processor 20. A display/circuitry driver(s) 22 can be included to receive signals from the processor 20 to drive the image on the video display 12 and an audio circuitry 24 can be included to receive signals from the processor 20 to output audio on the speakers 26.

A microphone 28, a camera 30, and an input device 32 can be included and communicate data external to the chassis 14 collected at the user's discretion to the processor 20. In some implementations, the microphone 28 and camera 30 can be built into the display chassis 14. In other embodiments, the microphone 28 and camera 30 are provided separately from the chassis 14 and communicate with the processor 20 over a wired path such as a USB path or a wireless path such as a Bluetooth path. The input device 32 may be a keyboard, keypad, mouse, voice recognition device, etc. but in the embodiment shown is a TV remote control and also communicate with the processor 20 over a wired path or a wireless path. In other implementations, multiple input devices 32 can be included.

A network interface 34 may be a wired or wireless modem and communicates with a friend's video display 36 over a wide area network (WAN) 38 such as the Internet. Alternatively, the network interface 34 may be a cable interface and can communicate with a cable head end and thence to the display devices of other users, such as the friend's video display 36. In both cases, multiple friend displays may be used in accordance with the principles below.

Moving in reference to FIG. 2, an example emotion presentation user interface (UI) displayed on the video display 12 allows the viewer to choose various selector elements via remote control 32. A selector element 40 enables the user to input text using, e.g., the remote control 32 that is presented along with the emotion indicator (described further below). In other implementations, a keypad or keyboard may be included as the input device 32. In another embodiment, a touch screen can include a keyboard, as in the case of display devices 10 that include a "touch" feature built into the display 12.

The viewer can choose a selector element 42 via remote control 32 that causes an actual image of the viewer 44 (one type of emotion indicator) as captured by the camera 30 to be overlaid onto video as explained further below. Also, a selector element 46 can be chosen to cause an emoticon 48 (a second type of emotion indicator) to be overlaid onto video as explained further below. The displayed emoticon 48 can be selected by the processor 20 from a library of emoticons stored on, e.g., the computer readable storage medium 18 to match closely as possible to the viewer's actual image 44 as captured by the camera 30 and processed by the processor 20 executing a facial recognition engine.

The viewer can elect to display the actual image 44 or emoticon 48 on the display 12 immediately with the title of the underlying video using the selector element 50 or without the title of the underlying video using selector element 52. Upon selection of selector element 50, the processor 20 may access an electronic program guide (EPG) or metadata of the video actually being presented to extract the title therefrom for display thereof on the display 12.

The viewer may elect to share the actual image 44 or emoticon 48 with a friend as described further below. The viewer can choose selector element 54 and can input an address of a friend display device, e.g., an Internet address, or a user name associated with the friend display device 60 (FIG. 4), e.g., a social networking site user name, or click on one of plural contacts in address book by clicking on address dropdown menu selector 56. Playback of the viewer's voice as captured by the microphone 28 may be turned "on" or "off" by the viewer's selection at selector element 58.

The viewer can cause the actual image 44 or emoticon 48 to be presented on the viewer's own display 12 as in FIG. 3, which shows the actual viewer image 44 overlaid on a video presentation without the video title. The viewer may alternatively cause the actual image 44 or emoticon 48 to be presented on a friend's video display 60 as in FIG. 4, which shows the emoticon 48 derived from the viewer's image 44 overlaid on a video presentation on the friend's display 60 with the title of the video being presented on the viewer's display 12 being overlaid also onto the video of the friend's display 60. It may now be appreciated that when the emoticon 48 of the viewer is presented on the friend's display 60, since the viewer may not know what the friend is watching, is can be helpful to also present the title of the video on the viewer's display 12 to which the emoticon 48 pertains, so the friend knows what the viewer is expressing an emotion about.

Figure 5:
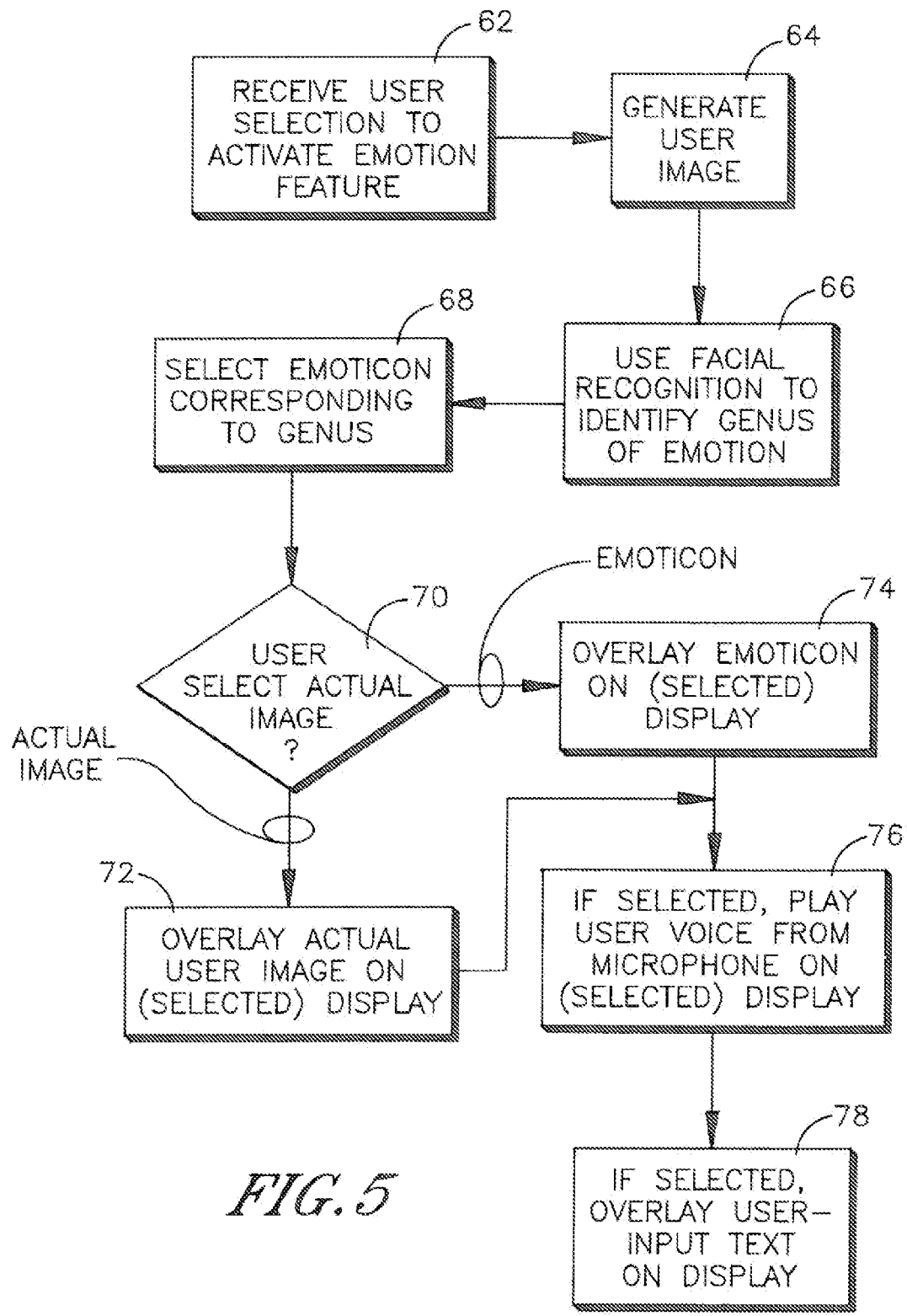
FIG. 5 is a flow chart of example logic in accordance with present principles.

Moving in reference to the flow chart of FIG. 5, the processor 20 receives the viewer's selection to activate the emotion feature via the input device 32, e.g., remote control, at block 62. The processor 20 then communicates to the camera 30 to generate an actual image of the viewer 44 at block 64 and uses facial recognition to identify the genus of the viewer's emotion captured in the actual image 44 at block 66. Once the genus of the emotion is established, the processor 20 selects a corresponding emoticon 48 at block 68.

The viewer must choose at decision diamond 70 to select the actual image 44 or the emoticon 48 to be displayed. Upon the viewer's selection that the actual image 44 is to be displayed, the processor 20 overlays the actual image 44 on the selected display, e.g. either the viewer's own display 12 or a friend's display 60, at block 72. Alternatively, at decision diamond 70, the viewer may select the emoticon 48 to be displayed, in which case the processor 20 overlays the emoticon 48 on the selected display, e.g. either the viewer's own display 12 or a friend's display 60, at block 74.

Once the emotion indicator has been selected by the viewer, the processor 20 plays the viewer's voice, if selected by the viewer to be played, as captured by the microphone 28 on the selected display, e.g. either the viewer's own display 12 or a friend's display 60, at block 76. The viewer can also select to present text inputted by the viewer via an input device 32, wherein the processor 20 overlays the text on the selected display, e.g. either the viewer's own display 12 or a friend's display 60, at block 78.

What is claimed is:

1. Audio video apparatus, comprising:
   video display;
   processor controlling the display to present video;
   computer readable storage medium accessible to the processor and bearing instructions executable by the processor to configure the processor to:
   present on the display an emotion presentation user interface (UI), the UI including a first selector element selectable to cause an actual image of a viewer of the display as captured by a camera to be overlaid onto video, the UI including a second selector element selectable by a user to cause an emoticon to be overlaid onto video, the emoticon being established by the processor responsive to selection of the second selector element to match closely as possible the actual image of the viewer as captured by the camera and processed by the processor executing a recognition engine;
   receive a viewer selection of the first selector element or the second selector element;
   responsive to a viewer selection of the first selector element, generate an actual image of a viewer of the display and overlay the image on the video; and
   responsive to a viewer selection of the second selector element, correlate the image to an emoticon and overlay the emoticon on the video.

2. The apparatus of claim 1, wherein the instructions executable by the processor further configure the processor to:
   present, along with the image or emoticon, audio generated by a viewer and captured by a microphone communicating with the processor.

3. The apparatus of claim 1, wherein the instructions executable by the processor further configure the processor to:
   present, along with the image of the viewer derived from the camera, a title of the video, the processor accessing a program guide to ascertain the title and present an alpha-numeric representation thereof along with the image of the viewer derived from the camera.

4. The apparatus of claim 1, wherein the processor causes the image or emoticon to be sent to an audio video display device remote from the apparatus.

5. The apparatus of claim 4, wherein the processor receives user identification of the audio video display device remote from the apparatus.

6. System comprising:
a viewer video display;
a processor coupled to the viewer video display;
a camera communicating with the processor;
the processor configured for executing logic on a computer readable storage medium to present on the display an emotion presentation user interface (UI), the UI including a first selector element selectable to cause an actual image of a viewer of the display as captured by a camera to be overlaid onto video, the UI including a second selector element selectable by a user to cause an emoticon to be overlaid onto video, the emoticon being established by the processor responsive to selection of the second selector element to match closely as possible the actual image of the viewer as captured by the camera and processed by the processor executing a recognition engine.

7. The system of claim 6, wherein the image of the viewer derived from the camera is an actual image of the viewer.

8. The system of claim 6, wherein the processor executes a facial recognition method to correlate one of plural emoticons to a facial image from the camera, and the image of the viewer derived from the camera is the one of plural emoticons.

9. The system of claim 6, wherein the presentation video display is established by the viewer video display.

10. The system of claim 6, wherein the presentation video display is a display other than the viewer video display, the viewer of the viewer video display being permitted to input an address associated with the presentation video display.

11. The system of claim 6, wherein the processor is further configured for presenting, along with the image of the viewer derived from the camera, audio generated by the viewer and captured by a microphone communicating with the processor.

12. The system of claim 6, wherein the processor is further configured for presenting, along with the image of the viewer derived from the camera, a title of the video, the processor accessing a program guide to ascertain the title and present an alpha-numeric representation thereof along with the image of the viewer derived from the camera.

13. Method comprising:
capturing an image of a viewer of a first audio video display using a camera associated with the first audio video display;
presenting on the display an emotion presentation user interface (UI), the UI including a first selector element selectable to cause an actual image of a viewer of the display as captured by a camera to be overlaid onto video, the UI including a second selector element selectable by a user to cause an emoticon to be overlaid onto video, the emoticon being established by the processor responsive to selection of the second selector element to match closely as possible the actual image of the viewer as captured by the camera and processed by the processor executing a recognition engine; and
responsive to user selection of the first or second selector element, presenting the actual image of the viewer or the emoticon, respectively.

14. The method of claim 13, wherein the emoticon is displayed on the first audio video display.

15. The method of claim 13, wherein the emoticon is displayed on the second audio video display.

16. The method of claim 13, further comprising presenting a title of video being watched along with the emoticon.

17. The method of claim 15, comprising receiving from a viewer of the first audio video display an identity of the second audio video display.

18. The method of claim 13, comprising presenting audio captured by a microphone associated with the first audio video display along with the emoticon.

19. The method of claim 13, comprising receiving text input from a viewer of the first audio video display and presenting the text along with the emoticon.

20. The method of claim 13, comprising executing facial recognition on the image at least in part to select the emoticon.

* * * * *